March 28, 1961 G. E. SEDGLEY 2,977,266
ENDLESS CONVEYOR BELT
Filed Nov. 19, 1959
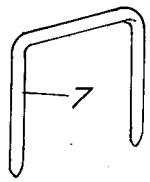
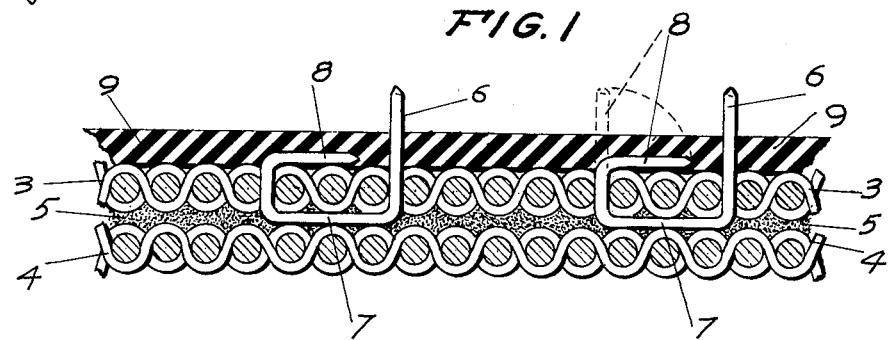
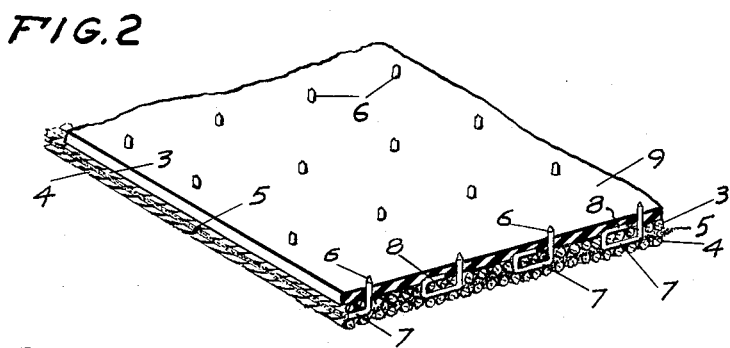
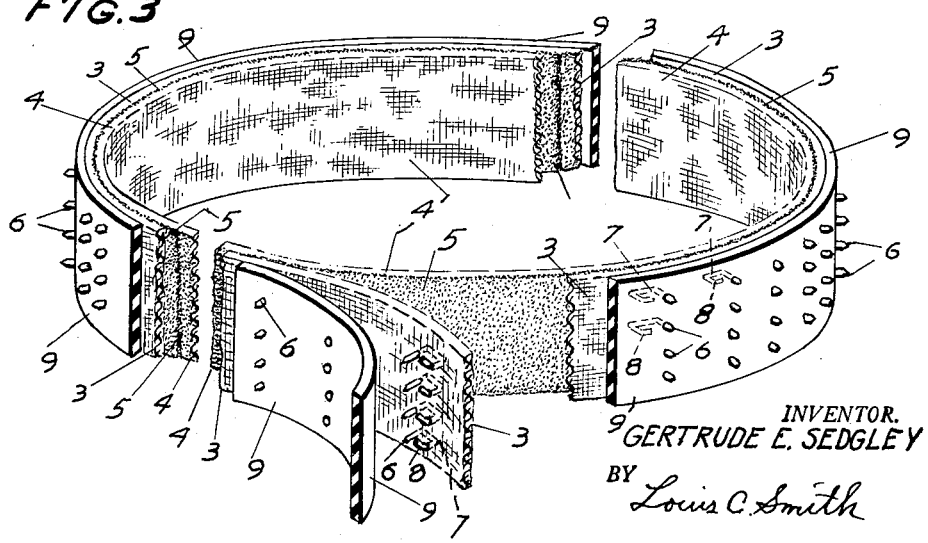
INVENTOR.
GERTRUDE E. SEDGLEY
BY Louis C. Smith
ATTORNEY

United States Patent Office 2,977,266
Patented Mar. 28, 1961

2,977,266

ENDLESS CONVEYOR BELT

Gertrude E. Sedgley, 127 School St., Concord, N.H.

Filed Nov. 19, 1959, Ser. No. 854,162

1 Claim. (Cl. 154—52.1)

This invention relates to endless conveyor belts of the type having pin-like projections or spurs extending from the operative face thereof for the purpose of holding the material being conveyed in proper position.

One object of the invention is to provide a novel endless conveyor belt of this type which is especially designed for conveying light-weight material in strip or sheet form.

Another object of the invention is to provide a conveyor belt of this type, the body of which is formed of two plies of fabric and in which the pin-like projections or spurs are carried entirely by the outer ply.

Other objects of the invention will be apparent from the following description of one embodiment of the invention.

In the drawings,

Fig. 1 is an enlarged sectional view showing a portion of a conveyor belt made in accordance with the invention;

Fig. 2 is a perspective view of a short section of the belt shown in Fig. 1;

Fig. 3 is a perspective view of the complete conveyor belt with portions broken out;

Fig. 4 is a perspective view of one of the staples which may be used in forming the pin-like projections or spurs that extend from the operative or material-carrying face of the conveyor belt.

The body of the conveyor belt herein illustrated is composed of two endless layers or plies of woven fabric which are indicated at 3 and 4, said plies having a superposed relation and being cemented together as shown at 5 by a suitable cement—preferably a rubber cement. The outer ply 3 carries a plurality of pin-like projections 6 which extend through the fabric and project beyond the outer face thereof. These projections 6 may conveniently be made from staples 7 such as shown in Fig. 4; and in the construction of the conveyor belt, the staples are mounted in the ply 3 before it is assembled with the ply 4. These staples are inserted through the ply 3 from the back face thereof and in positions to produce any desired design on the front face of the finished conveyor belt. After each staple has been inserted through the ply 3, one leg 8 of the staple is bent over against the front face of said ply, as shown in Fig. 1, the other leg 6 of the staple extending beyond the ply to form one of the pin-like projections or spurs. In the construction shown, these staples are so attached to the ply 3 that they are arranged in rows extending transversely of the belt; but it will be obvious that the staples could be mounted in the ply 3 in positions to produce any desired pattern.

After the ply 3 has been provided with the desired number of staples and each staple has been clenched to the fabric as shown, then the two endless plies 3 and 4 are sleeved together and are united by cement 5 which, as stated above, will preferably be in the nature of a rubber cement. The cementing of the two plies 3 and 4 together may be accomplished by applying a coating of cement to the back face of the ply 3, and, if desired, also to the outer face of the ply 4 while the endless plies are separated from each other and before they are assembled so that when they are assembled the cement coated faces of the two plies are in contact with each other.

After the two plies 3 and 4 have thus been properly assembled and cemented together, the outer face of the ply 3 is covered by a sheet 9 of natural or synthetic rubber which is punctured by the legs 6 of the staples so that the ends of said legs project beyond the rubber facing 9.

After the parts of the conveyor belt have been thus assembled, the belt will be subjected to heat and pressure by which the plies are firmly compacted and vulcanized together thereby producing a unitary structure.

The staples 7 will preferably be coated with a rubber-to-metal bonding material so that during the above operation they will become firmly bonded to the fabric.

In the manufacture of the conveyor belt, each conveyor belt may be fabricated as an individual article or an endless structure of considerable width may be made as described above and then subsequently cut into narrow strips, each of which constitutes a single conveyor belt.

I claim:

An endless conveyor belt comprising two superposed endless plies of fabric cemented together, a plurality of staples extending through and carried by the outer ply, one leg of each staple being bent over into contact with the outer face of the outer ply, and a sheet of rubber material cemented to and covering both the outer face of said outer ply and the bent over portion of one leg of each staple, the other leg of each staple projecting through said sheet of rubber and beyond the outer face thereof.

References Cited in the file of this patent

UNITED STATES PATENTS

| | | |
|---|---|---|
| 944,031 | Gillet | Dec. 21, 1909 |
| 1,137,925 | Taft | May 4, 1915 |
| 2,002,079 | Dickie | May 21, 1935 |
| 2,488,442 | Snape | Nov. 15, 1949 |